2,945,645
AIRCRAFT VARIABLE LIFT WING

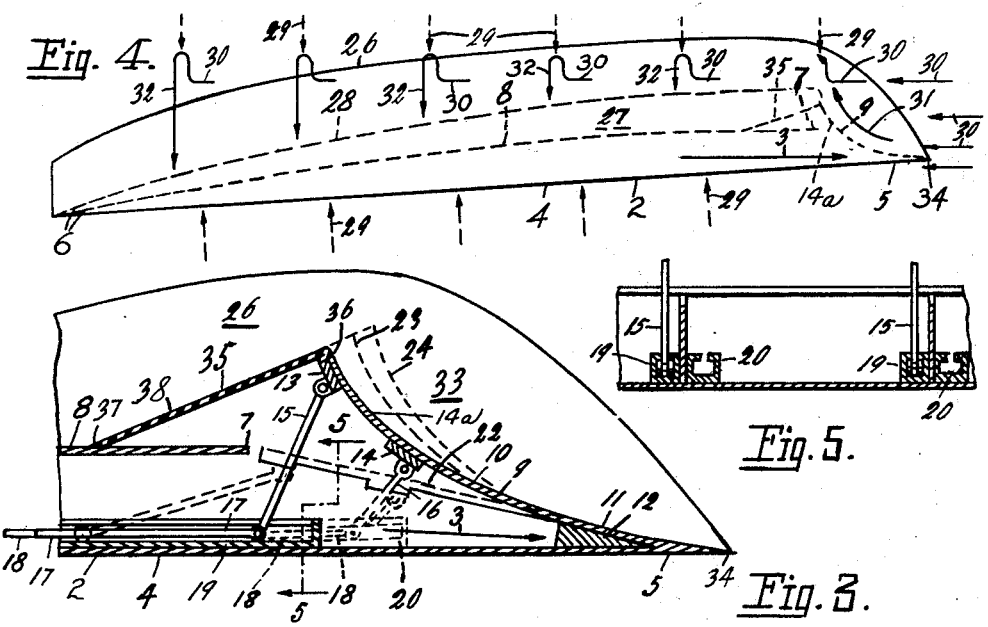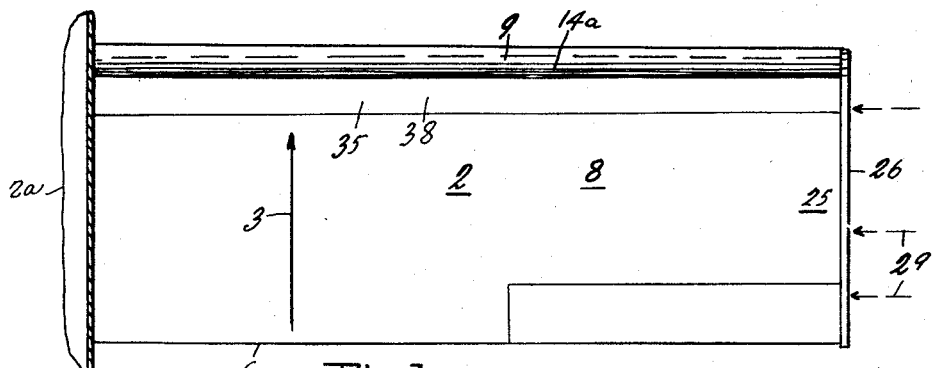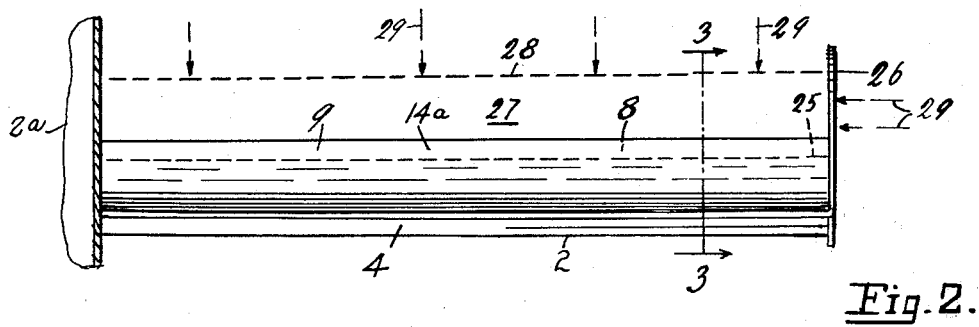

Ludwig Schwarzmayr, 2402 California St., San Francisco 15, Calif.

Filed June 19, 1956, Ser. No. 592,374

2 Claims. (Cl. 244—42)

My invention relates to improvements in aircraft wings of the type shown and described in my copending application Serial No. 515,041, filed June 13, 1955, and the application Serial No. 587,516 filed May 28, 1956.

One object of my invention is to maintain low pressure in the zone 27 above the upperside of the aircraft wing.

Another object is to provide aircraft wing with an air projector for varying the angle of projection away from the upper surface of the wing to reduce pressure against the upper surface of the wing when desired under various conditions and A further object is to maintain relatively low pressure in the zone above the upper side of the wing.

I attain these objects by the construction illustrated in the accompanying drawing, in which—

Figure 1 is a plan view of the aircraft wing provided with the suction increasing means and the suction maintaining means of the invention;

Fig. 2 is a front elevation of the wing of Fig. 1;

Fig. 3 is a section of the forward part of the blade on line 3—3 in Fig. 2;

Fig. 4 is an end view of the wing of Fig. 1;

Fig. 5 is a section on line 5—5 in Fig. 3.

The aircraft wing 2 extending from the fuselage 2ª, which is shown segmentary. The line of movement of the wing 2 is shown by the arrow 3. The aircraft wing 2 has a wedge-shaped leading edge member 5, a flat lower surface member 4 extending rearwardly from the leading edge member 5. An upper surface member 8 extends from the trailing edge 6 forwardly to the point 7 spaced rearward of the leading edge member 5 of the wing 2. An air projector 9 extends rearwardly and upwardly from the leading edge member 5. The air projector 9 is formed by a flexible sheet 10, the forward end 11 of which is secured to the frame member 12 of the wing leading edge member. Frame members 13 and 14 are secured to the sheet projecting member 14ª spaced from the frame member 12 and spaced from each other. The rods 15 and 16 are pivotally connected with the frame members 13 and 14 and with the operating rods 17 and 18, which are disposed slidingly in the guides 19 and 20. By operating the rods 17 and 18 the air projector 14a can be positioned to various curvatures and angles of projection with respect to the lower surface member 4 of the wing and the upper side 8 of the wing 2, and be positioned as follows. When starting a take-off operation the sheet 10 is positioned as shown by the broken line 22 so to provide the least resistance, and when a sufficient rate of speed is obtained the air projector 14a is positioned to the full lines 9 but for movement at a high rate of speed the air projector 14a is positioned to the line 22. For landing operation the air projector 14a is positioned as shown by the broken lines 23 and 24.

From the end 25 (see Figs. 1 and 2) of the upper side 8 of the wing 2 extends perpendicularly a flange-like, the rigid plate 26 to above the low pressure zone 27 above the upper side 8 of the wing 2. The low pressure zone 27 is outlined by the broken line 28. The rigid plate 26 prevents entrance of air under atmospheric pressure to the upper surface 8 of the wing 2 from outside the end 25 of the upper surface 8 of the wing 2. The arrows 29—29 illustrate atmospheric pressure. The arrows 30—30 indicate the stationary mass of air. The arrow 31 illustrates the stream of air projected by the air projector 9. The stream of air 31 is projected with great force in a direction away from the upper surface 8 of the wing 2 and engages the stationary mass of air 30, therefore, causing the movement of the stationary mass of air as is illustrated by the arrow lines 30—30. When the momentum and pressure of the stream of air 31 is exhausted air under atmospheric pressure 29 will push the stationary mass of air 30 toward the upper surface 8 of the wing 2. As is shown by the arrow lines 32 the stream of air 31 delays the movement of air under atmospheric pressure 29 sufficiently to keep the upper surface 8 of the wing 2 free of atmospheric pressure 29. The rigid plate 26 extends forwardly beyond the pressure zone 33 of the air projector 9 to the edge 34 of the wedge-shaped leading edge member 5, therefore, prevents sidewise escape of air from the pressure zone 33 and forms with the wedge 34 a partial enclosure of the pressure zone 33 of the air projector 9.

An elastic sheet 35 is secured to the extending end 36 of the sheet 10 and its rear end 37 is secured to the forward part of the upper surface 8 of the wing 2 and forms an enclosure 38 for the operation mechanism of the air projector 9.

The wing in combination with the air projector 9 and the rigid plate 26 extending vertically from the end 25 of the upper side member 8 of the wing 2 increases the lift force of the wing 2.

The air projector 9 in conjunction with the rigid plate 26 produces a relatively long low pressure zone 27 therefore, makes relatively wide but short wings practical and advantageous. Wide wings provide long connecting sides by which a strong connecting structure between the fuselage 2a and the wing blade is facilitated which reduces the danger of wings breaking off the fuselage which happens quite frequently.

The projecting member 14a of the sheet 10 when positioned as shown in full lines or the broken lines 23 and 24 in combination with the plate 26 which prevents movement of air to the upper surface 8 of the wing from the outside the end 25 increases and maintains lift force in take-off and landing operation.

I claim:

1. An aircraft wing comprising, in combination, a wedge-shaped leading edge member, a flat lower surface member extending rearwardly from said leading edge member, an upper surface member extending forwardly from the trailing edge of the wing to a point spaced rearward of said leading edge member, a flexible sheet member fixed at one end to said leading edge member and extending rearwardly and upwardly, means connected with said sheet member to selectively flex said sheet member to various positions relative to said lower surface member, and means to prevent movement of air under atmospheric pressure to said upper surface member from outside the end of the upper surface member of the wing.

2. The structure recited in claim 1, and extensible and contractible closure means secured to the rear end of said flexible sheet member and the forward portion of said upper surface member for closing the gap therebetween.

(References on following page)

References Cited in the file of this patent

UNITED STATES PATENTS

| | | |
|---|---|---|
| 1,631,259 | Gilmore | June 7, 1927 |
| 1,704,449 | Waldy | Mar. 5, 1929 |
| 1,724,110 | Reid | Aug. 13, 1929 |
| 1,724,883 | Morris | Aug. 13, 1929 |
| 1,921,636 | Quemin | Aug. 8, 1933 |
| 2,503,585 | Loedding | Apr. 11, 1950 |
| 2,504,684 | Harper | Apr. 18, 1950 |
| 2,552,073 | Tindall | May 8, 1951 |
| 2,755,039 | Davie | July 17, 1956 |

FOREIGN PATENTS

| | | |
|---|---|---|
| 450,138 | France | Jan. 10, 1913 |